United States Patent [19]

Hamai

[11] 4,211,189

[45] Jul. 8, 1980

[54] INTERNAL COMBUSTION ENGINE WITH DUAL INDUCTION SYSTEM AND MORE PARTICULARLY TO COMBUSTION CHAMBER DESIGN THEREOF

[75] Inventor: Kyugo Hamai, Yokosuka, Japan

[73] Assignee: Nissan Motor Company, Limited, Yokohama, Japan

[21] Appl. No.: 961,044

[22] Filed: Nov. 15, 1978

[30] Foreign Application Priority Data

Jan. 12, 1978 [JP] Japan .................................. 53/2274

[51] Int. Cl.² .................... F02B 19/16; F02B 19/10
[52] U.S. Cl. ................................... 123/308; 123/309; 123/657
[58] Field of Search ................. 123/75 B, 30 C, 30 D, 123/32 ST, 32 SP

[56] References Cited

U.S. PATENT DOCUMENTS

| | | | |
|---|---|---|---|
| 2,652,039 | 9/1953 | Weslake | 123/75 B |
| 3,154,059 | 10/1964 | Witzky | 123/32 ST |
| 3,211,137 | 10/1965 | Love | 123/75 B |
| 3,678,905 | 7/1972 | Diehl | 123/75 B |
| 3,868,940 | 3/1975 | Kirchweger | 123/30 C |
| 3,903,849 | 9/1975 | List | 123/30 C |

Primary Examiner—Ronald B. Cox
Attorney, Agent, or Firm—Lowe, King, Price & Becker

[57] ABSTRACT

A spark ignition reciprocatory internal combustion engine with dual induction system is provided in which at low and intermediate loads when only a primary throttle valve within a primary induction system opens, a primary intake port passage within a cylinder head will direct fluid charge into a combustion chamber in a cylinder to swirl therein as a primary intake valve opens, while, at high loads when a secondary throttle valve within a secondary induction system opens also, a secondary intake port passage within the cylinder head will direct fluid charge into the combustion chamber in the cylinder in such a direction as to impede and reduce the swirling motion of the fluid charge from the primary intake port passage as a secondary intake valve opens, thereby to maintain the volumetric efficiency of the engine at a sufficiently high level. The secondary intake valve is operated to open in synchronization with the opening of the primary intake valve. The entire combustion chamber is formed by the clearance volume between the upper surface of a piston and the lower surface of the cylinder head and by a cavity formed in the cylinder head.

7 Claims, 5 Drawing Figures

INTERNAL COMBUSTION ENGINE WITH DUAL INDUCTION SYSTEM AND MORE PARTICULARLY TO COMBUSTION CHAMBER DESIGN THEREOF

BACKGROUND OF THE INVENTION

The present invention relates to an internal combustion engine with dual induction system including a primary induction system to direct a first fluid charge into a cylinder to swirl therein under all operating conditions of the engine via a primary intake valve and a secondary induction system to direct a second fluid charge into the cylinder via a secondary intake valve in such a direction as to impede and reduce the swirling motion of the first fluid charge issuing from the primary induction system under predetermined operating conditions of the engine, thereby maintaining the volumetric efficiency of the engine at a sufficiently high level. More particularly, the invention relates to a combustion chamber design of the engine as above.

With conventional internal combustion engines of the construction as mentioned above a primary intake valve and a secondary intake valve are reciprocably supported by a cylinder head, the heads of the primary and secondary intake valves lie within the lower surface of the cylinder head which extends across the cylinder bore when the valves are closed. The entire combustion chamber is formed by the clearance volume between the upper surface of a piston within the cylinder bore and the lower surface of the cylinder head. The secondary intake valve is operated to open in synchronization with the opening of the primary intake valve. Under low and intermediate loads an air fuel mixture charge is drawn into the combustion chamber through a primary induction or primary port passage via the primary intake valve to swirl within the combustion chamber when the primary intake valve is opened. Since the secondary intake valve is opened in synchronization with the opening of the primary intake valve under these loads, the head of the secondary intake valve is likely to hamper the swirling motion of the incoming air fuel mixture from the primary port passage and to cause a portion of the air fuel mixture to flow into a secondary intake port passage. This phenomena will be significant if the primary port passage is angled as to direct air fuel mixture charge to produce a flattened swirl within the combustion chamber.

SUMMARY OF THE INVENTION

The present invention includes a cylinder or a combustion chamber having a piston reciprocably mounted therein. A cylinder head is positioned over one end of the cylinder and has primary and secondary intake valves. The entire combustion chamber is formed by the clearance volume (main chamber) between the lower surface of the cylinder head and the upper surface of the piston and by a cavity (an auxiliary chamber) formed in the cylinder head. The primary intake valve is arranged within the lower surface of the cylinder head and the secondary intake valve arranged within the cavity. An air fuel mixture is drawn from the primary intake valve into the cylinder to swirl within the main chamber during all of the engine operating conditions of the engine. Since it is arranged within the auxiliary chamber, the secondary intake valve will not hamper the swirling air fuel mixture from the primary intake valve when the secondary intake valve is opened.

As the piston approaches its top dead center position during the compression stroke, a squish is produced by the decreasing clearance between the piston and the adjacent surface of the cylinder head. The squish action forces the swirling air fuel mixture into the cavity. Due to the squish action the troidal motion is superimposed upon the swirling air fuel mixture, thereby giving rise to substantial increase in its rate of swirl.

An object of the present invention is to provide an internal combustion engine in which when there is no admission of air fuel mixture or air into a cylinder through a secondary intake valve, an air fuel mixture is drawn from a primary intake valve into the cylinder to swirl therein to provide a sufficiently high swirl rate.

Other objects of the present invention will become readily understood as the description proceeds in connection with the accompanying drawings.

DESCRIPTION OF THE PREFERRED EMBODIMENTS

Figure 1:
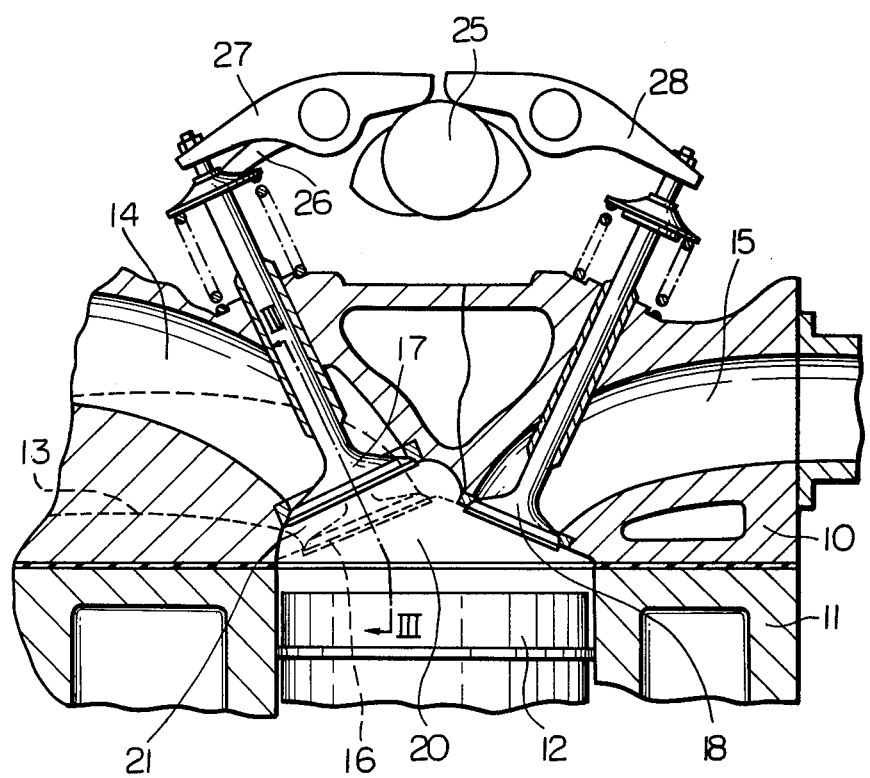
FIG. 1 is a sectional view taken through the line I—I shown in FIG. 2 of a first preferred embodiment of an internal combustion engine according to the present invention.
Figure 2:
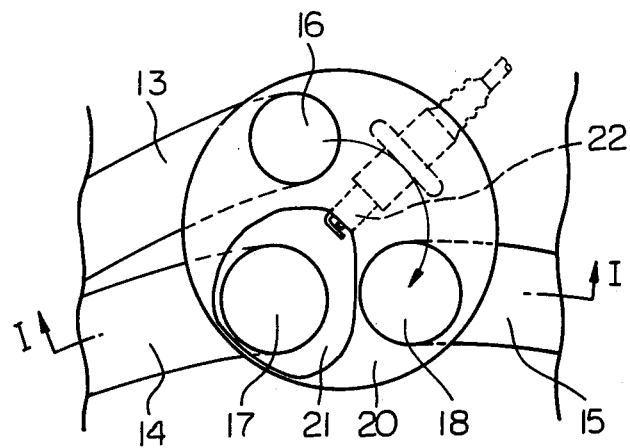
FIG. 2 is a plan view of the engine shown in FIG. 1.
Figure 3:
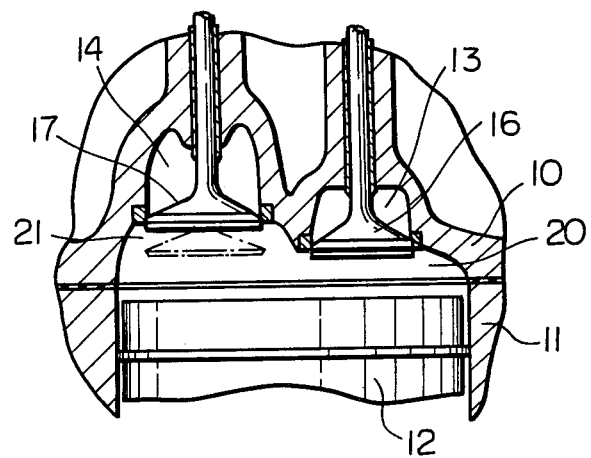
FIG. 3 is a sectional view taken through the line III—III shown in FIG. 1.

Referring to FIGS. 1 through 3, the engine comprises a cylinder head 10 and a cylinder block 11 having a cylinder bore within which is a reciprocable piston 12. The cylinder head 10 is positioned over the end of the cylinder bore to close the same. The piston 12 is adapted to be reciprocated in the cylinder bore by a crankshaft and connecting rod, neither of which are shown.

The cylinder head 10 has a small primary intake port passage 13, a large secondary intake port passage 14, and an exhaust port passage 15. A small primary intake valve 16, a large secondary intake valve 17 and an exhaust valve 17 are reciprocably supported or mounted within the cylinder head 10.

The heads of the primary intake valve 16 and exhaust valve 18 lie flush with the lower surface of the cylinder head 10 when these valves are closed. The lower surface of the cylinder head 10 extends across the cylinder bore of the cylinder block 11. The entire combustion chamber is formed by the clearance volume or a main chamber 20 between the upper surface of the piston 12 and the lower surface of the cylinder head 10 and by a cavity 21 formed in the cylinder head 10 within the lower surface thereof. The cavity defines an auxiliary chamber 21. The head of the secondary intake valve 17 lie flush with the bottom surface of the cavity 21.

The cavity or auxiliary chamber 21 is deep enough to prevent the head of the primary intake valve 17 from projecting or plunging into the main chamber 20 as the primary intake valve 17 is fully opened to take its maximum lift position as shown by phantom line in FIG. 1.

The auxiliary chamber 21 has a region around the circumference of the valve head of the secondary intake valve 17 and also has a second region adjacent the cylinder axis. A spark plug 22 is arranged with its electrode disposed adjacent the cylinder axis and communicating with the second region of the auxiliary chamber 21 (see FIG. 2).

The primary intake port passage 13 carries an air fuel mixture during all operating conditions of the engine. The fuel may be supplied to the primary intake port passage 13 by a carburetor or a fuel injector. The secondary intake port passage 14 carries an air fuel mixture or air during engine operating conditions with high loads. The fuel may be supplied from the carburetor or a fuel injector.

The primary intake port passage 13 is curved so that air fuel mixture drawn into the main chamber 20 swirls around the cylinder axis, has an oval cross section, and has a small angle with a plane perpendicular to the cylinder axis. The secondary intake port passage 14 has a large circular cross sectional area and has a large angle with the plane perpendicular to the cylinder axis. The secondary intake port passage direct air fuel mixture or air in such a direction as to impede and reduce the swirling motion of air fuel mixture from the primary intake port passage 13.

As shown in FIG. 1, the primary, secondary intake and exhaust valves 16, 17 and 18 are operated by usual a cam actuating mechanism having a cam shaft 25 and rocker levers or arms 26, 27 and 28. The secondary intake valve 17 is operated by the cam actuating mechanism to open in synchronization with the opening of the primary intake valve 16.

During the engine operating conditions with low and intermediate loads, an air fuel mixture is drawn into the cylinder bore through the primary intake port passage 13 only, and swirls around the cylinder axis in a direction indicated by an arrow in shown in FIG. 2.

Since the secondary intake valve 17 does not project into the main chamber 20 when it is fully opened, the swirling motion within the chamber 20 will not be hampered. As a result, a sufficiently strong swirling motion is assured during the induction stroke.

During the compression stroke the primary and secondary intake valves 16 and 17 closes and the piston 12 moves upward from the bottom dead center position. As the piston 12 approaches its top dead center position during the compression stroke, a squish action is produced by the decreasing clearance between the piston 12 and the adjacent surface of the cylinder head 10. The squish action forces the swirling air fuel mixture into the cavity 21. Due to the squish action the troidal motion is superimposed upon the swirling air fuel mixture. Since the momentum of the air fuel mixture is conserved, compression of the mixture into the auxiliary chamber 21 gives rise to substantial increase in its rate of swirl.

Since the spark plug 22 is positioned so that its electroder or terminal intersect the swirling mixture within the auxiliary chamber 21 at the time of ignition, upon ignition the flame travels rapidly across the mixture because of turbulence.

The increase in propagation speed of flame due to turbulence will make it possible to accomplish stable combustion at lean air fuel mixture or with heavy EGR. As a result, fuel economy as well as low NOx is accomplished.

At high loads, the secondary intake port passage 14 admits an air fuel mixture or air into the cylinder bore to impede and reduce the swirling motion of the air fuel mixture issuing from the primary intake port passage 13, thereby assuring sufficiently high volumetric efficiency of the engine.

It will be understood that since its electrode of the spark plug 22 intersects the swirling mixture within the auxiliary chamber 21 and scavenged thereby, ignition will be assured. Furthermore, since the ignition initiates at the auxiliary chamber 21 depressed from the lower surface of the cylinder head 10 which is less likely to become a quench zone, there is no appreciable increase in HC emissions.

Figure 4:
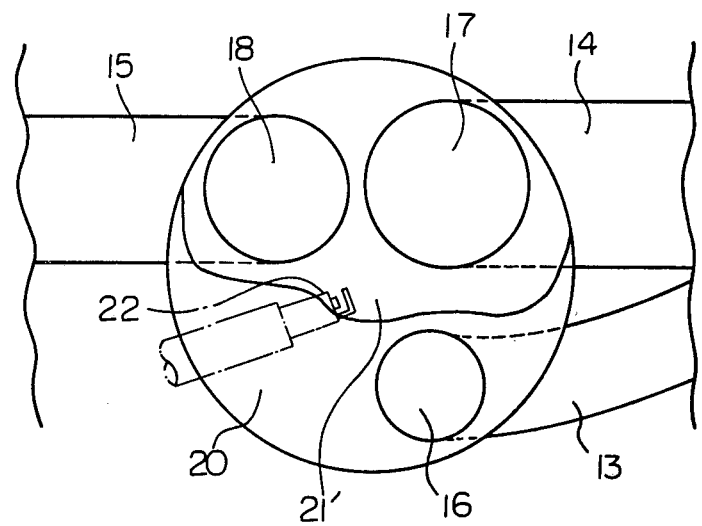
FIG. 4 is a similar view to FIG. 2 showing a second preferred embodiment.

FIG. 4 shows an embodiment in which an auxiliary chamber is enlarged and within this auxiliary chamber 21' an exhaust valve 18 is disposed or arranged.

With this arrangement of the exhaust valve 18 in which the head of the exhaust valve 18 lies flush with the bottom wall of the auxiliary chamber 21', the exhaust gases can be scavenged efficiently from the auxiliary combustion chamber 21' also. Since, with this exhaust valve arrangement, the temperature around the exhaust valve 18, which is relatively high, is utilized to keep the air fuel mixture disposed around the spark plug 22 high enough to assure ignition.

Figure 5:
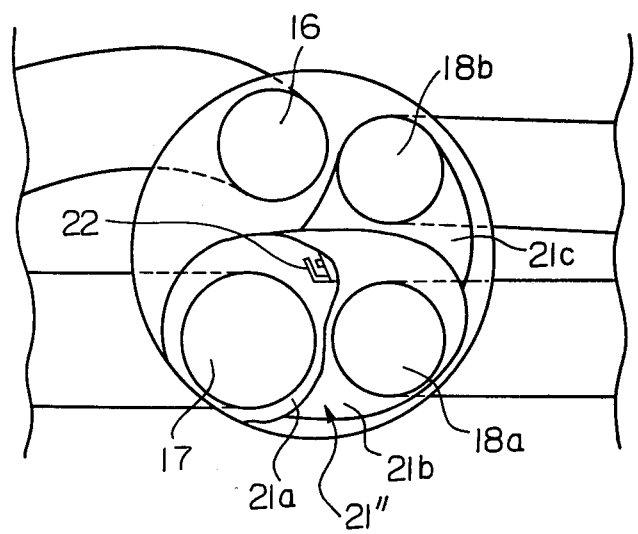
FIG. 5 is a similar view to FIG. 2 showing a third preferred embodiment.

FIG. 5 shows an embodiment in which a plurality, two exhaust valves 18a and 18b are arranged within an auxiliary combustion chamber 21' to scavenge to auxiliary chamber 21' at a high efficiency. In this case, the bottom wall of the auxiliary chamber 21' should be such that the area denoted by 21a where the head of the secondary intake valve 17 is arranged is deepest, the area denoted by 21b where the head of the exhaust valve 18a is arranged is shallower than the area 21a but deeper than the area 21c where the head of the other exhaust valve 18b is arranged.

It will now be understood that the secondary valve arrangement thus described prevents the secondary intake valve as it opens from hampering generation of swirl, during engine operation at light and intermediate load, within the combustion chamber resulting from the inflowing air fuel mixture from the primary air intake valve.

It will also be understood that during the compression stroke under the engine operating condition at low and intermediate loads the swirl still exist within the auxiliary chamber where the spark plug exists and it is strong enough so that after the ignition the combustion flame propagates at a fast rate thus improving combustion under this engine operating condition.

This improved combustion under the engine operating condition at light and intermediate load will permit engine operation at lean mixture or at high EGR than conventional, thus improving the fuel economy and reducing the exhaust emissions.

It will also be understood that since the provision of exhaust valve within the auxiliary chamber will result in an increase in the scavenging efficiency around the spark plug, the overheating of and the unsafe ignition by the spark plug, which would otherwise would take place due to the presence of the residual gas, will be prevented. Since the scavenging efficiency is increase to reduce the amount of residual gas, the induction efficiency of the fresh charge will be increased, resulting in an increase in engine power output.

What is claimed is:

1. An internal combustion engine comprising:
a cylinder block having a cylinder formed therein;
a piston reciprocably mounted within said cylinder;
a cylinder head positioned over one end of said cylinder, said cylinder head having a surface and a cavity formed therein and arranged within said surface;

a main chamber formed by the clearance volume between said surface of said cylinder head and said piston;

an auxiliary chamber formed by said cavity;

a primary intake valve reciprocably mounted within said cylinder head and arranged within said surface;

a secondary intake valve reciprocably mounted within said cylinder head and arranged within said cavity;

said cylinder head having therein a primary intake port passage leading to said primary intake valve and adapted to direct a first fluid charge into said cylinder to swirl in said main chamber under all of the operating conditions of the engine; and said cylinder head having therein a secondary intake port passage leading to said secondary intake valve and adapted to direct a second fluid charge into said cylinder in such a direction as to impede the swirling motion of the first fluid charge under predetermined operating conditions of the engine.

2. An internal combustion engine as claimed in claim 1, in which said secondary intake valve is operated to open in synchronization with the opening of said primary intake valve.

3. An internal combustion engine as claimed in claim 1, in which said secondary intake valve will not plunge into said main chamber as said secondary intake valve opens.

4. An internal combustion engine as claimed in claim 1, in which a spark plug is so located as to ignite the charge in said cavity.

5. An internal combustion engine as claimed in claim 1, in which at least one exhaust valve is arranged within said cavity.

6. An internal combustion engine as claimed in claim 1, in which, in operation, under the operating conditions of the engine except said predetermined operating conditions of the engine, at the end of the compression stroke, the swirling first fluid charge is driven into said cavity by "squish" action between said piston and said surface of said cylinder head and, as a result, said charge swirls in said cavity at an increased rate.

7. An internal combustion engine as claimed in claim 6, in which, in operation, under the operating conditions of the engine except said predetermined operating conditions of the engine, said charge swirling in said cavity at the increased rate is ignited.

* * * * *